United States Patent [19]

Hawkins

[11] Patent Number: 5,125,039
[45] Date of Patent: Jun. 23, 1992

[54] OBJECT RECOGNITION SYSTEM

[76] Inventor: Jeffrey C. Hawkins, 18 W. Summit Ave., Redwood City, Calif. 94062

[21] Appl. No.: 367,153

[22] Filed: Jun. 16, 1989

[51] Int. Cl.$^5$ .............................................. G06K 9/00
[52] U.S. Cl. ........................................ 382/30; 382/34; 382/16
[58] Field of Search ....................... 382/30, 55, 18, 24, 382/14, 34, 16

[56] References Cited

U.S. PATENT DOCUMENTS

| 4,461,029 | 7/1984 | Van Bilzem et al. | 382/55 |
| 4,641,355 | 2/1987 | Hongo et al. | 382/34 |
| 4,850,026 | 7/1989 | Jeng et al. | 382/30 |
| 4,887,303 | 12/1989 | Hongo | 382/34 |
| 4,887,304 | 12/1989 | Terzian | 382/30 |
| 4,922,545 | 5/1990 | Endoh et al. | 382/56 |

*Primary Examiner*—Michael Razavi
*Assistant Examiner*—Yon Jung
*Attorney, Agent, or Firm*—Townsend and Townsend

[57] ABSTRACT

An object recognition system that includes feature encoding and dictionary look-up procedures that are independent of any particular feature set. The procedures utilize only logical operations and require no multiplications. Only one dictionary entry per object is utilized.

16 Claims, 3 Drawing Sheets

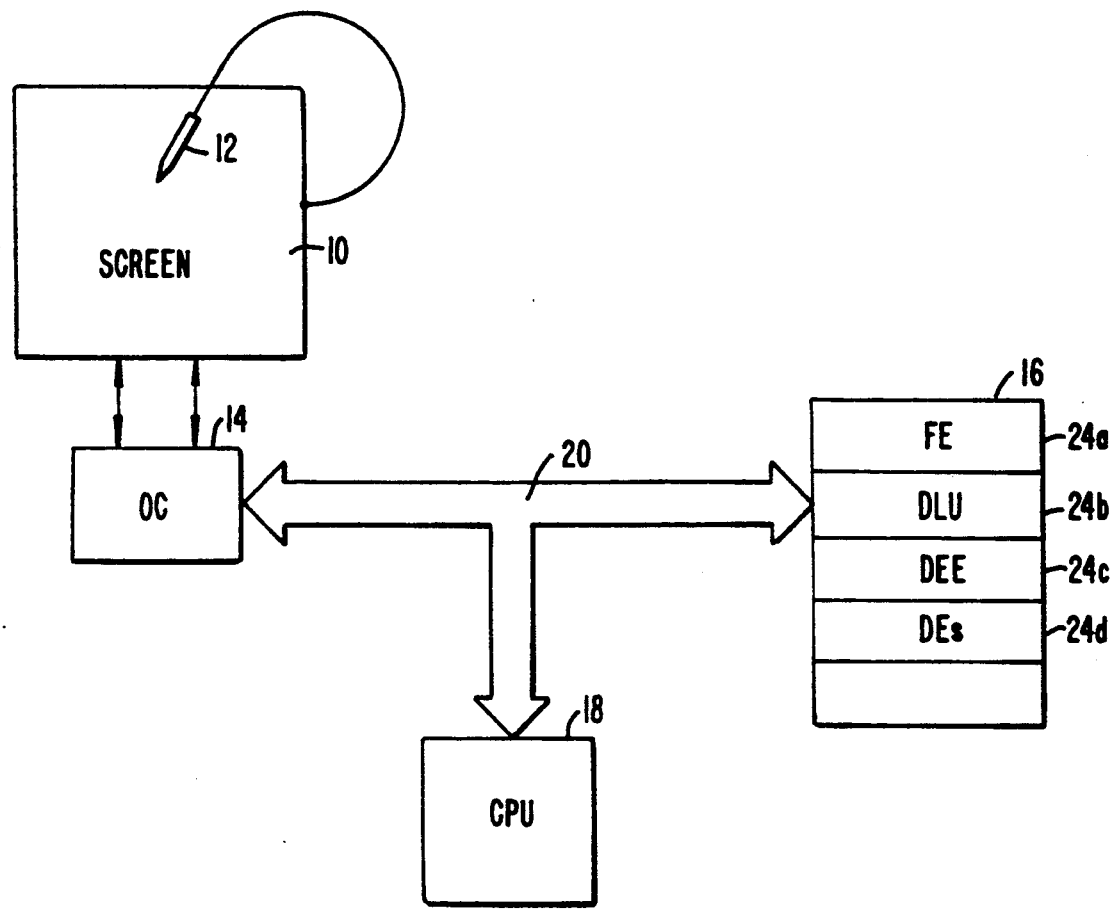
FIG._1.
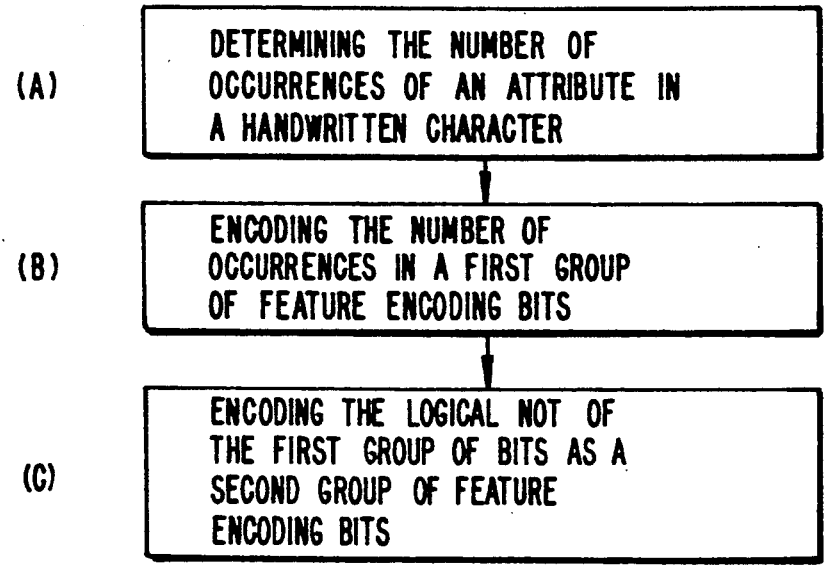
FIG._2.

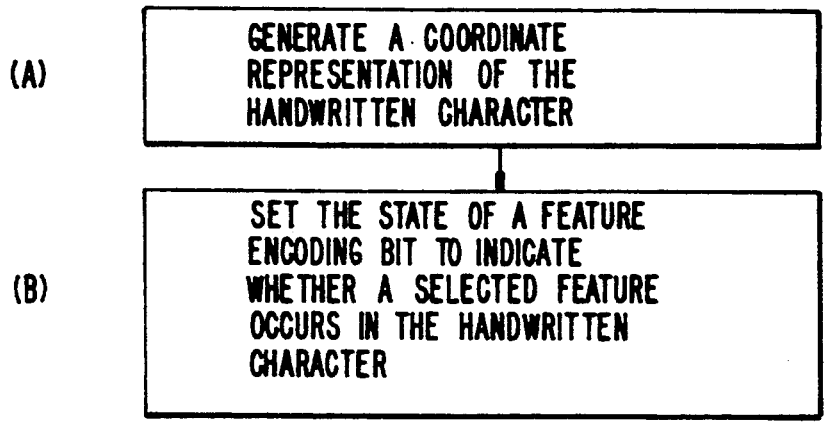
FIG._2A.
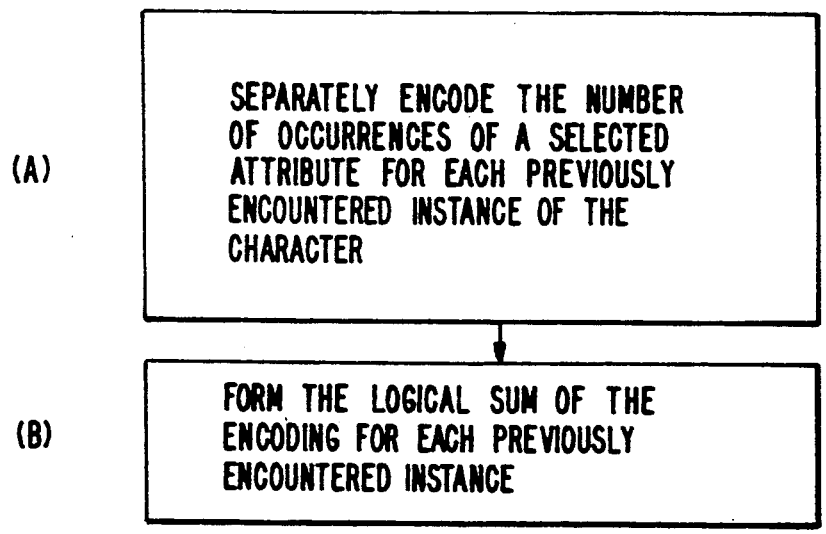
FIG._3.

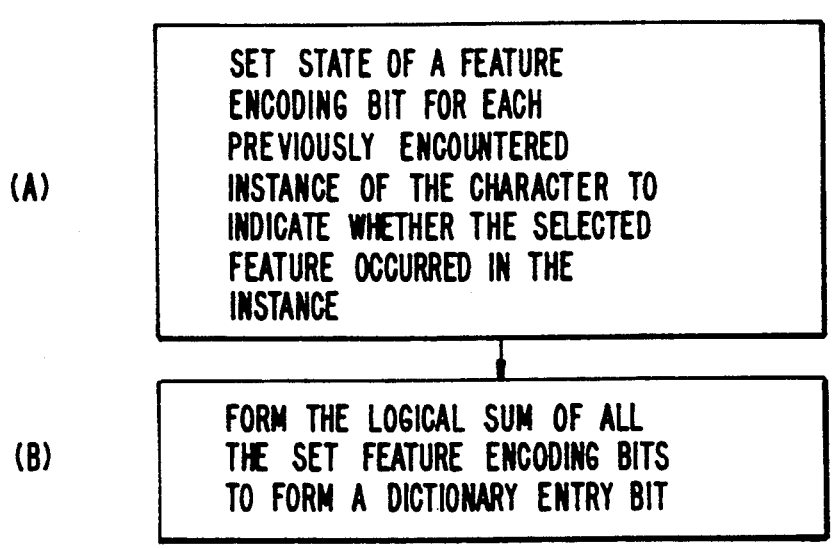
FIG.\_3A.
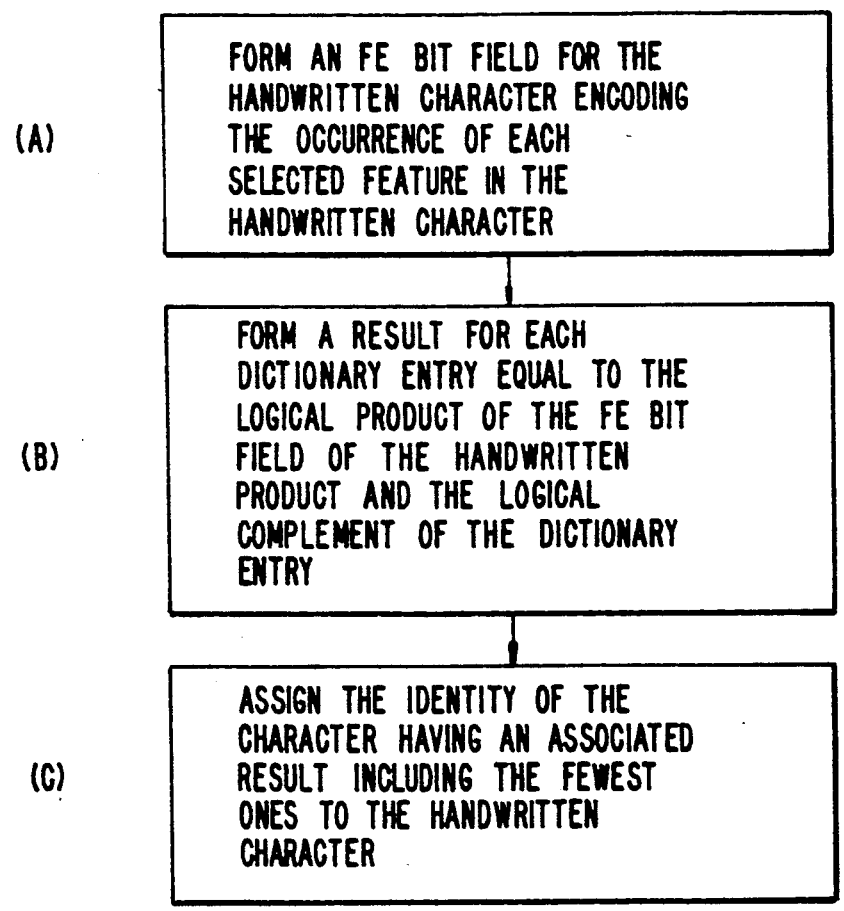
FIG.\_4.

OBJECT RECOGNITION SYSTEM

BACKGROUND OF THE INVENTION

As the use of computer has become increasingly necessary to increase efficiency in business, science, manufacturing, and so forth great efforts are being expended to make the use of a computer easy for people who have very little knowledge or interest in operating a computer or managing complex software.

The most direct way to interact with a computer is to write data or commands directly on a special surface, have the computer recognize what has been written and either record the data or perform the command. Such systems have been developed but generally require large memory and complex processing and are not suitable for use in small to medium size computers.

Generally, these systems must convert the symbol written on the surface to one of predetermined set of alphanumeric characters stored in memory. Although the features of characters stored in the memory are fixed and known to the computer, the features of characters written by human beings have many variations. Thus, the main problem for the system is recognizing which character has been written.

One standard approach is to define a feature set and encode a given character as a set of features. Dictionary entries are then stored for the given character. If there are several ways that users are known to write the given character, then multiple dictionary entries are stored, each encoding an ideal feature set for the given character. Storing multiple entries for each character increases storage and look-up time.

Accordingly, a great need exists for a more effective character recognition system.

SUMMARY OF THE INVENTION

The present invention is a system and method for recognizing objects that include novel means of encoding the occurrence of features in an instance of an unknown object, for forming dictionary entries for each object in an object set, and for utilizing the feature encoding and dictionary entry to efficiently assign the identity of one of the objects in the set to the unknown object.

The dictionary entry for a given object is formed by encoding whether a selected feature has ever occurred in a previously encountered instance of the object. The dictionary entry for an associated object and the encoding for a given instance of an unknown object are logically processed to generate a result indicating whether a feature occurring in the given instance has never occurred in any previously encountered instance of the associated object.

The unknown object is assigned the identity of the object associated with the result indicating that the number of features occurring in the given instance of said unknown object that have never occurred in any instance of said given object is less than the number of features occurring in the given instance of the unknown object that have never occurred in any instance of any other object included in the set of objects.

Other features and advantages of the invention will become apparent in view of the appended figures and following detailed description

BRIEF DESCRIPTION OF THE DRAWINGS

FIG. 1 is a block diagram of the hardware environment of the invention;

FIG. 2 is a flow chart illustrating a procedure for encoding the number of occurrences of an attribute in an instance of a character:

FIG. 2A is a flow chart illustrating a general procedure for encoding the occurrence of a feature;

FIG. 3 is a flow chart illustrating a procedure for forming a dictionary entry relating to the number of occurrences of a selected attribute;

FIG. 3A is a flow chart of a general procedure for forming a dictionary entry: and FIG. 4 is a flow chart of a character identification look-up procedure.

DETAILED DESCRIPTION OF THE PREFERRED EMBODIMENTS

Hardware Environment

FIG. 1 depicts a typical hardware environment required to practice the invention. In FIG. 1 a screen 10 includes an interactive pointing system, such as a conductive pen 12 and coordinate generator 14, for writing characters on the screen 10. The coordinate generator 14 and a system memory 16 are coupled to a CPU 18 by a DBUS 20.

As a character is written with the pen 12 the coordinates of each point of contact are stored in the memory 16. Unique feature encoding (FE), dictionary look-up (DLU), and dictionary entry encoding (DEE) software modules 24a, b, and c, respectively as well as the dictionary entries (DEs) 24d are stored in the system memory 16.

This particular hardware environment in not critical to the operation of the invention but is intended as an example to facilitate the following description of the operation of the invention.

Feature Encoding

The selection of an optimal feature set is important for efficient recognition of characters in a given character set. This selection may be done by trial and error or by other methods. The present invention is directed to encoding the occurrence of features in a written character, the procedure for forming a dictionary entry for each character, and the look-up procedure for utilizing the dictionary entry and feature encoding to identify the handwritten character.

In the preferred embodiment, the screen coordinates of the written character to be recognized are encoded as an FE bit field of arbitrary length that includes subfields encoding whether features related to a particular attribute is included in the written character.

For example, if a selected feature is the occurrence of at least one inflection in the handwritten character the coordinate dots forming the handwritten character are analyzed in groups of three to determine whether a stroke segment of the character is turning clockwise or counter-clockwise. The number of transitions from clockwise to counter-clockwise indicates the number of inflections in the handwritten character.

The format of a given subfield is best understood by considering a concrete example. Assume that the occurrence of inflections is an attribute that has been found useful to recognize characters and that an 8-bit subfield is used to encode a number of features relating to occurrences of an inflection in a character. The format for encoding the number of inflections is as follows (where bit 0 is the rightmost bit in the field):
The first four bits have the following definitions:

bit 0 = 1 if the character has 1 or more inflections.

bit 1 = 1 if the character has 2 or more inflections.

bit 2 = 1 if the character has 3 or more inflections.

bit 3 = 1 if the character has 4 or more inflections.

The upper four bits are the logical NOT of the first four bits.

bit 4 = 1 if the character has 0 inflections.

bit 5 = 1 if the character has 1 or fewer inflections.

bit 6 = 1 if the character has 2 or fewer inflections.

bit 7 = 1 if the character has 3 or fewer inflections.

Thus, each feature encoding bit encodes a feature related to a particular attribute, i.e., the occurrence of at least a given number of inflections (first four bits) or the occurrence of less than a given number of inflection (second four bits).

The usefulness of the upper four bits will become apparent below. The following are several examples of encoding the inflection subfield of the FE bit field:

11110000 = character has 0 inflections.

11100001 = character has 1 inflection.

10000111 = character has 3 inflections.

As stated above, the FE bit field contains a subfield for each attribute that has been selected as useful for identifying characters. Each subfield is encoded as above, although the length of the subfield need not be limited to 8-bits. Thus, if 12 attributes were selected and the features related to each attribute were encoded in an 8-bit subfield then the length of the FE bit field would be 96 bits.

The above process of encoding a number of occurrences of an attribute is illustrated in the flow chart of FIG. 2. In FIG. 2, after the number of occurrences of the attribute is determined the number of occurrences are encoded as features in the first group of bits of the subfield. Additionally, the logical NOT of the first encoded group of bits is encoded in the second group of bits. Again, in the above example the second group of bits are the four higher order bits in the subfield.

The order of steps B and C in FIG. 2 is of no consequence and the steps could be performed simultaneously.

A more general feature encoding method is depicted in the flow chart of FIG. 2A. First, a coordinate representation of the handwritten character is generated. Secondly, the state of a feature encoding bit is set to indicate whether the feature occurred in the handwritten character.

Dictionary Entry Encoding

In a given instance of a character to be recognized certain selected features will occur and other selected features will not occur. However, different people may write the same character in manners having different numbers of the same feature. For example, one person might write the letter "S" with one inflection and another might write it with two inflections. Ideally, the dictionary entries for the character should reflect these two possibilities, or as the case may be, more than two possibilities, so that the different instances of the same character would be recognized.

In the present system, one dictionary entry may encode whether selected features have ever occurred in any previously encountered instance of the character associated with the dictionary entry. Additionally, the modification of the dictionary to reflect these different possibilities is accomplished by one logical operation.

The dictionary entries are DE bit fields encoded utilizing the same format described above with reference to feature encoding. By way of example, assume that the original dictionary entry for the letter "S" includes a feature bits indicating that "S" has 1 inflection. If a second instance of "S" having two inflections is encountered the original dictionary entry will not have encoded this instance of the letter "S". Accordingly, the dictionary entry for "S" will be changed to reflect these two possible instances by forming the logical sum (OR operation) of the encoding for the occurrence of 1 inflection and the occurrence of two inflections as illustrated by the following example:

11100001 encoding for one occurrence
OR 11000011 encoding for two occurrences
11100011 encoding for at least one inflection and up to two inflections.

The possible occurrence of each of the selected features are encoded in the DE bit field. Accordingly, the number of occurrences of features in different instances of the same character are encoded in one DE bit field and the DE bit field is easily modified if a new occurrence of the character is encountered.

The method for forming dictionary entries will now be described with reference to the flow chart of FIG. 3. In step A, the number of occurrences of a selected attribute in each encountered instance of the character is separately encoded. In the above example, two instances of the letter "S" have been encountered. Separate FE bit fields encoding one occurrence and two occurrences have been separately encoded. Next, the logical sum of the separate encoded instances is performed to form a first order dictionary entry that encodes the possible numbers of occurrences of the feature for the encountered instances of the character.

If a new instance of the character is encountered, the number of occurrences of the feature is encoded and ORed with the first order dictionary entry to form an updated dictionary entry. This updated dictionary entry encodes the possible number of occurrences for each instance including the newly encountered instance.

A more general encoding method is illustrated in FIG. 3A. First, the state of a separate feature encoding bit is set for each previously encountered instance of a character to indicate whether a selected feature occurred in the instance of the character. Secondly, the logical sum (OR) of the previously set feature bits is performed to form a first order dictionary entry bit. Thirdly, the state of a new feature encoding bit is set to indicate whether the selected feature occurs in a newly encountered instance of the character. Finally, the logical product of the newly set feature bit and the first order dictionary bit is generated to form a revised dictionary entry bit.

The encoding format of the DE bit field allows for the efficient look-up and character identification procedure described next.

Character Recognition and Dictionary Look-Up

In operation the system encounters instances of characters which may have never been encountered before and have not been encoded into the dictionary entries. However, to have utility the system must efficiently recognize these instances and assign the correct character identity. The procedure for identifying characters is illustrated by the flow chart of FIG. 4.

Initially, the occurrence of each selected feature in the unknown character is encoded as described above to form an FE bit field. Next, a result is formed for each dictionary entry that is equal to the logical product (AND) of the FE bit field of the handwritten character and the logical complement (NOT) of the DE bit field. The unknown character is assigned the identity of the character having a dictionary entry with the result including the least number of ones.

This procedure will now be illustrated with reference to the above examples. As previously explained, the DE bit field "11100011" encodes the fact that previously encountered letters "S" had at least one inflection and can have up to two inflections. Assume that this subfield is included in the current dictionary entry for the character "S".

If the unknown character has no inflections the inflection subfield will be encoded as "11110000". The result for the unknown character and the current dictionary entry for "S" is:

|   | 11110000 unknown character with no inflections |
|---|---|
| AND | 00011100 NOT of dictionary entry for "S" |
|   | 00010000 result |

The "1" in bit 4 of the result indicates that no instance of "S" has ever been encountered which has 0 inflections.

The first four bits encode features relating to the number of occurrences of an attribute, e.g., an inflection. The corresponding dictionary entry bits indicate whether these features have been previously encountered and are used during the look-up procedure to indicate whether the unknown character has more occurrences of the feature than occurred in any previously encountered instance of the character. However, the first four bits cannot indicate whether the unknown character has fewer occurrences of the feature than any instance of the character previously encountered. Thus, these bits could not be used to indicate that a straight line, having no inflections, is not an "S". This problem is solved by the second four bits.

The occurrence of less than a fixed number of inflections is a separate feature that could be encoded according to the process of FIG. 2A. Alternatively, this feature could be encoded by forming the logical complement (NOT) of the feature encoding bit indicating the occurrence of at least the fixed number of inflections.

If the unknown character had one inflection the inflection subfield is encoded as "11100001". The result for the unknown character and current dictionary entry for "S" is:

|   | 11100001 unknown character with one inflection |
|---|---|
| AND | 00011100 NOT of current dictionary entry for "S" |
|   | 00000000 result |

Since the result has fewer 1's than the previous character it is more likely to be an "S".

In this example the subfield for only one attribute was considered. For FE bit fields encoding the number of occurrences of several attributes the results will more strongly differentiate between dictionary entries.

In the above example, each feature was related to the number of occurrences (or lack of occurrences) of a particular number of inflections. However, features do not necessarily encode the number of times a particular attribute occurs. For example, a useful attribute is the direction of a stroke. Features relating to this attribute are whether the stroke direction is north, south, east, or west, and thus are unrelated to number of occurrences.

Building and Revising the Dictionary

Building a dictionary utilizing the system described is a straightforward process. In the case of handwriting recognition, for example, handwriting samples from several people are gathered and a set of features deemed useful for recognizing characters is selected. Some feature sets will provide better character recognition than other feature sets. The present invention facilitates experimenting with different feature sets to optimize recognition because the feature encoding, dictionary encoding, and look-up procedures are independent of the particular features selected.

Dictionary entries for each character are then built by forming the FE bit field for each instance of the character and forming the logical sum of the FE bit fields. The system is then tested and more features are added until the individual characters can be differentiated and recognized regardless of which instance of the character is written.

If during use, a new instance of a character is encountered that is misidentified the dictionary entry for the character can be updated by forming the logical sum of the FE bit field of the new character and the DE bit field of the correct character. In some cases it will be necessary to add new features to the feature set to properly identify the new instance of a character.

Although the system has been described in an embodiment that recognizes characters it is generally useful in any object recognition environment. For example, machine parts on an assembly line might need to be identified so that a robot hand may select the correct parts. The part may be presented at different orientations so that its various images correspond to the different instances of a written character as described above. The dictionary entry for the part would encode the possible number of occurrences of a feature when viewed from various orientations. The feature encoding, dictionary entry encoding, and look-up procedures described above would be utilized to identify the part.

Further, although the embodiment above has been described with respect to process steps performed by a CPU many of the steps can be directly implemented by hardware. For example, the encoding of the number of occurrences of various features and the dictionary look-up procedures could be easily and quickly accomplished utilizing decoders and logic array circuitry. Additional substitutions and modifications within the scope of the invention will now be apparent to persons of ordinary skill in the art Accordingly, it is not intended to limit the invention except as provided by the appended claims.

What is claimed is:

1. A system for recognizing the identity of an unknown object comprising:
   a collection of dictionary entry bit fields, one of said dictionary entries associated with a distinct object included in a predetermined set of objects, with each dictionary entry encoding which features in a set of features have ever occurred in any instance of the object associated with the dictionary entry;
   means for forming a feature encoding bit field separately encoding which features in said set of features occurs in a given instance of the unknown object;
   means for logically processing such dictionary entry and said feature encoding field to form a set of results, each result associated with a distinct object in said set of objects, with each result indicating which features in said set of features occurring in said given instance of the unknown object have never occurred in any instance of the object associated with said result; and
   means for assigning the identity of a given object in said predetermined set of objects associated with a result that indicates that the number of features occurring in said given instance of said unknown object that have never occurred in any instance of said given object is less than the number of features occurring in said given instance of said unknown object that have never occurred in any instance of any other object included in said set of objects.

2. The system of claim 1 wherein:
   each object in said set of objects is a character; and said unknown object is a handwritten character.

3. A system for recognizing the identity of an a handwritten character comprising:
   a set of dictionary entry bits, one of said dictionary entry bits associated with each character in a character set, with each dictionary entry bit encoding whether a selected feature has ever occurred in any instance of the character associated with the dictionary entry bit;
   means for forming a feature encoding bit encoding whether said selected feature occurs in a given instance of the handwritten character;
   means for logically processing each dictionary entry bit and said feature encoding bit to form a set of result bits, each result bit associated with a distinct character in said character set, with each result bit indicating whether said selected feature occurring in said handwritten character has never occurred in any instance of the character associated with said result: and
   means for utilizing said result bits to assign the identity of a given character in said character set to said handwritten character.

4. The system of claim 3 wherein said means for logically processing comprises:
   means for forming the logical product (AND) of said feature encoding bit and the logical complement (NOT) of said dictionary entry bit.

5. A system for recognizing the identity of an object comprising:
   means for setting the state of a feature encoding bit indicating whether a given feature occurs in a given instance of a given object;
   means for forming a dictionary entry bit equal to the logical sum of a set of feature encoding bits for a set of previously encountered instances of the given object and the feature encoding bit of the given instance of the object indicating whether the given feature has ever occurred in any encountered instance of the object
   means for setting the state of a feature encoding bit indicating whether said given feature occurs in an instance of an unknown object; and
   means for forming a result bit equal to the logical product of said feature encoding bit of the instance of the unknown object and the logical complement of said dictionary entry bit that indicates whether said given feature occurring in said instance of said unknown object has ever occurred in any previously encountered instance of the given object.

6. A system for recognizing the identity of an object comprising:
   means for setting the state of a feature encoding bit indicating whether a given feature occurs in a given instance of an given object;
   means for forming a feature encoding NOT bit equal to the logical complement of said feature encoding bit indicating whether said given feature has not occurred in said given instance;
   means for forming a first dictionary entry bit equal to the logical sum of a set of feature encoding bits for a set of previously encountered instances of the given object and said feature encoding bit of said given instance of the object indicating whether the given feature has ever occurred in any encountered instance of the object; and
   means for forming a second dictionary entry bit equal to the logical sum of a set of feature encoding NOT bits for a set of previously encountered instances of said given object and said NOT feature encoding bit of the given instance of the object indicating whether the given feature has never occurred in any encountered instance of the object.

7. The system of claim 6 further comprising:
   means for setting the state of a feature encoding bit indicating whether said given feature occurs in an instance of an unknown object; and
   means for forming a NOT result bit equal to the logical product of said NOT feature encoding bit of the instance of the unknown object and the logical complement of said NOT dictionary entry bit that indicates whether said given feature that does not occur in said instance of said unknown object has never occurred in any previously encountered instance of the given object.

8. A system for recognizing the identity of an unknown object comprising:
   a collection of dictionary entry bit fields, one of said dictionary entries associated with a distinct object included in a predetermined set of objects, with each dictionary entry encoding which features in a set of features have ever occurred and which features in said set of features have never occurred in any instance of the object associated with the dictionary entry;
   means for forming a feature encoding bit field separately encoding which features in said set of features occurs and which features in said set of features do not occur in a given instance of the unknown object;

means for logically processing each dictionary entry and said feature encoding field to form a set of results, each result associated with a distinct object in said set of objects, with each result indicating which features in said set of features occurring in said given instance of the unknown object have never occurred in any instance of the object associated with said result and indicating which features not occurring in said given instance of the unknown object have always occurred in any instance of the object associated with said result; and means for assigning the identity of a given object in said set of objects associated with a result indicating the fewest number of occurrences and non-occurrences of features in the given instance of the unknown object that have never occurred or have always occurred, respectively, in all instances of the object associated with said result.

9. A method for recognizing the identity of an unknown object comprising:

providing a collection of dictionary entry bit fields, one of said dictionary entries associated with a distinct object included in a predetermined set of objects, with each dictionary entry encoding features in a set of features which have ever occurred in any instance of the object associated with the dictionary entry;

forming a feature encoding bit field separately encoding which features in said set of features occurs in a given instance of the unknown object;

logically processing each dictionary entry and said feature encoding field to form a set of results, each result associated with a distinct object in said set of objects, with each result indicating which features in said set of features occurring in said given instance of the unknown object have never occurred in any instance of the object associated with said result; and assigning the identity of a given object in said predetermined set of objects associated with a result that indicates that the number of features occurring in said given instance of said unknown object that have never occurred in any instance of said given object is less than the number of features occurring in said given instance of said unknown object that have never occurred in any instance of any other object included in said set of objects.

10. The method of claim 9 wherein:

each object in said set of objects is a character; and said unknown object is a handwritten character.

11. A method for recognizing the identity of an a handwritten character comprising:

providing a set of dictionary entry bits, one of said dictionary entry bits associated with each character in a character set, with each dictionary entry bit encoding whether a selected feature has ever occurred in any instance of the character associated with the dictionary entry bit;

forming a feature encoding bit encoding whether said selected feature occurs in a given instance of the handwritten character;

logically processing each dictionary entry bit and said feature encoding bit to form a set of result bits, each result bit associated with a distinct character in said character set, with each result bit indicating whether said selected feature occurring in said handwritten character has never occurred in any instance of the character associated with said result; and utilizing said result bits to assign the identity of a given character in said character set to said handwritten character.

12. The method of claim 11 wherein said step of logically processing comprises the steps of:

forming the logical product (AND) of said feature encoding bit and the logical complement (NOT) of said dictionary entry bit.

13. A method for recognizing the identity of an object comprising:

setting the state of a feature encoding bit indicating whether a given feature occurs in a given instance of a given object;

forming a dictionary entry bit equal to the logical sum of a set of feature encoding bits for a set of previously encountered instances of the given object and the feature encoding bit of the given instance of the object indicating whether the given feature has ever occurred in any encountered instance of the object;

setting the state of a feature encoding bit indicating whether said given feature occurs in an instance of an unknown object; and forming a result bit equal to the logical product of said feature encoding bit of the instance of the unknown object and the logical complement of said dictionary entry bit that indicates whether said given feature occurring in said instance of said unknown object has ever occurred in any previously encountered instance of the given object.

14. A system for recognizing the identity of an object comprising:

setting the state of a feature encoding bit indicating whether a given feature occurs in a given instance of an given object;

forming a feature encoding NOT bit equal to the logical complement of said feature encoding bit indicating whether said given feature has not occurred in said given instance;

forming a first dictionary entry bit equal to the logical sum of a set of feature encoding bits for a set of previously encountered instances of the given object and said feature encoding bit of said given instance of the object indicating whether the given feature has ever occurred in any encountered instance of the object; and forming a second dictionary entry bit equal to the logical sum of a set of feature encoding NOT bits for a set of previously encountered instance of said given object and said NOT feature encoding bit of the given instance of the object indicating whether the given feature has never occurred in any encountered instance of the object.

15. The method of claim 14 further comprising:

setting the state of a feature encoding bit indicating whether said given feature occurs in an instance of an unknown object; and forming a NOT result bit equal to the logical product of said NOT feature encoding bit of the instance of the unknown object and the logical complement of said NOT dictionary entry . bit that indicates whether said given feature that does not occur in said instance of said unknown object has never occurred in any previously encountered instance of the given object.

16. A system for recognizing the identity of an unknown object comprising:
- providing a collection of dictionary entry bit fields, one of said dictionary entries associated with a distinct object included in a predetermined set of objects, with each dictionary entry encoding which features in a set of features have ever occurred and which features in said set of features have never occurred in any instance of the object associated with the dictionary entry;
- forming a feature encoding bit field separately encoding which features in said set of features occurs and which features in said set of features do not occur in a given instance of the unknown object;
- logically processing each dictionary entry and said feature encoding field to form a set of results, each result associated with a distinct object in said set of objects, with each result indicating which features in said set of features occurring in said given instance of the unknown object have never occurred in any instance of the object associated with said result and indicating which features not occurring in said given instance of the unknown object have always occurred in any instance of the object associated with said result; and
- assigning the identity of a given object in said set of objects associated with a result indicating the fewest number of occurrences and non-occurrences of features in the given instance of the unknown object that have never occurred or have always occurred, respectively, in all instances of the object associated with said result.

* * * * *